Figure 1:
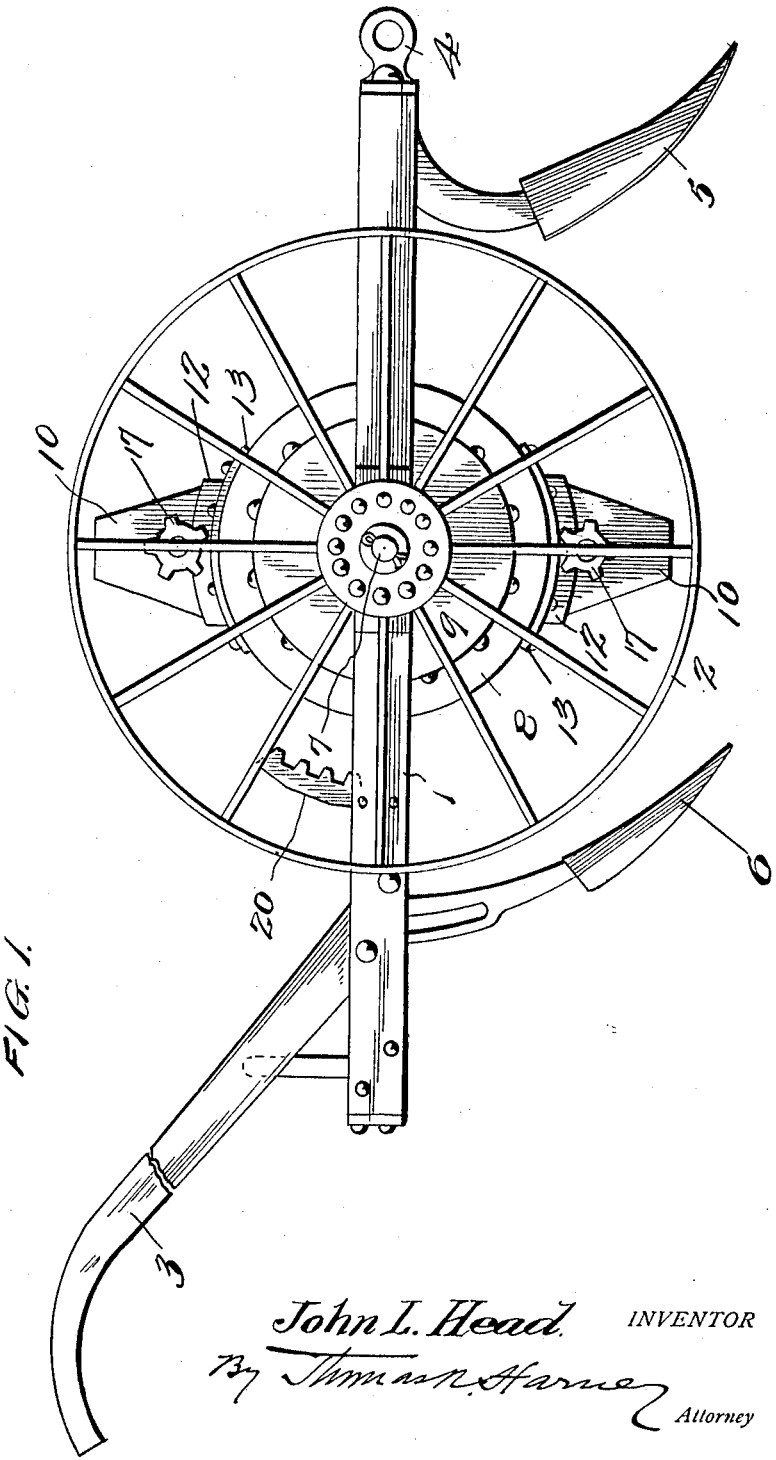

J. L. HEAD.
AGRICULTURAL IMPLEMENT.
APPLICATION FILED APR. 4, 1912.

1,041,077.

Patented Oct. 15, 1912.

2 SHEETS—SHEET 1.

WITNESSES
C. N. Davis
George A. ...

John L. Head  INVENTOR
By Thomas N. Harris
Attorney

J. L. HEAD.
AGRICULTURAL IMPLEMENT.
APPLICATION FILED APR. 4, 1912.
1,041,077.
Patented Oct. 15, 1912.
2 SHEETS—SHEET 2.
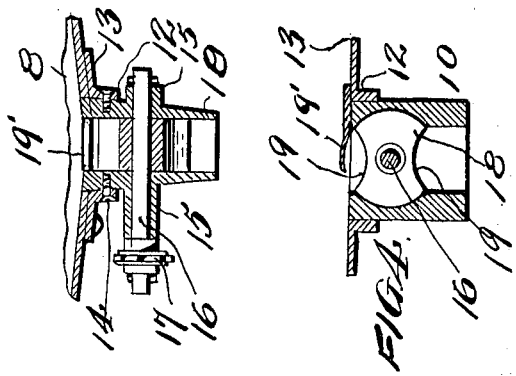
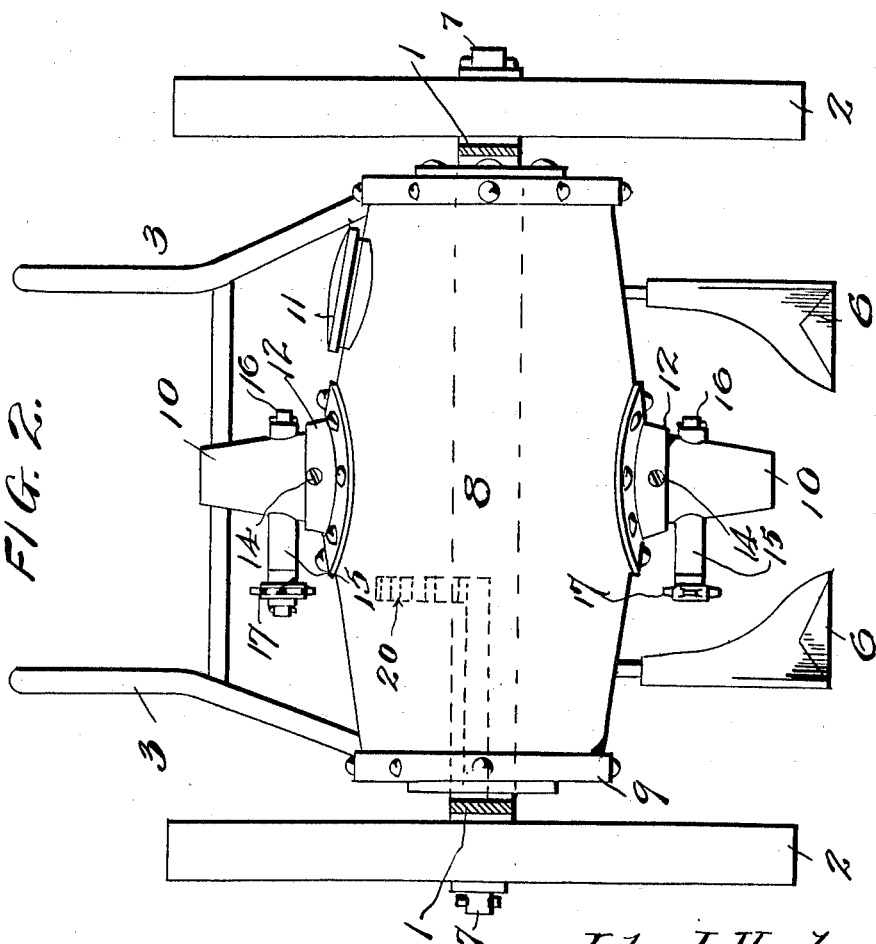
WITNESSES
C. K. Davis
George A. Duehring
John L. Head INVENTOR
By Thomas R. Harris
Attorney

UNITED STATES PATENT OFFICE.

JOHN LLOYD HEAD, OF HABANA, CUBA, ASSIGNOR OF ONE-FOURTH TO WILLIAM B. FAIR, OF HABANA, CUBA.

AGRICULTURAL IMPLEMENT.

1,041,077. Specification of Letters Patent. Patented Oct. 15, 1912.

Application filed April 4, 1912. Serial No. 688,389.

*To all whom it may concern:*

Be it known that I, JOHN L. HEAD, a citizen of the United States, residing at Habana, in the Province of Habana and Republic of Cuba, have invented certain new and useful Improvements in Agricultural Implements, of which the following is a specification.

The present invention relates to improvements in seed planters.

The object of the invention is the provision of an agricultural implement of this character that may be used for planting cotton, corn, or other seed, at regular intervals in the plowed earth, to conform with the required spacing and arrangements for planting seed of this nature.

The invention consists in certain novel features of construction and combinations and arrangements of parts as hereinafter set forth and claimed.

In the accompanying drawings I have illustrated one complete example, and a modification thereof, of the best mode I have so far devised for the practical application of the principles of the invention.

Figure 1 is a side view of an agricultural implement embodying the novel feature of my invention. Fig. 2 is a vertical sectional view through the supporting frame and looking toward the rear of the implement. Fig. 3 is a vertical detail sectional view of the seed spout and dropper mechanism. Fig. 4 is a similar view at right angles to Fig. 3.

In the preferred embodiment of my invention I utilize a rectangular frame 1, which is supported on the traction wheels 2, and at its rear is provided with handles 3, 3. At the forward end of the frame a draft appliance or device 4 is attached to which may be hitched a horse or mule for pulling the implement.

Located centrally of the implement, at or near the front thereof, is an opener or plow 5, which is adapted to open the soil directly in front of the seed dropping mechanism, while at the rear of the frame, and supported therefrom, are a pair of plows, spaced apart, and indicated at 6, 6, and adapted to turn the soil in toward the center line of travel of the implement. By this arrangement of plows, the forward plow 5, when pulled through the ground opens a furrow, and the two rear plows 6 cover the soil back into the center line of travel.

Located between the front and rear plows, and suspended by means of the axles 7, of the wheels 2, in the rectangular frame 1, is the seed receptacle or carrier 8. As clearly seen in Fig. 2 the receptacle is of greater diameter at its longitudinal center than at the ends which are closed by the heads 9. This shape of the seed carrier or receptacle insures a flow of seed at all times to one or the other of the diametrically arranged spouts 10. It will be understood of course that the receptacle is hollow, and may be filled with seed through the opening closed by the cap 11.

The spouts 10 are attached to the receptacle or drum 8 through the medium of open rings 12, which are in turn, attached, by flanges 13 and bolts, to the drum. The spouts may be quickly attached or detached by means of the screw or screws 14. As best seen in the sectional detail views, the spouts 10 are each provided with bearing sleeves 15, 15 in which is journaled a shaft 16 which extends through the spout and sleeves, and at one end is provided with a spur or sprocket-wheel 17.

Rotatable with the shaft 16, and located within the spout is a disk 18, provided with diametrically arranged recesses or cut out portions 19, which form cups for dropping the seed from the drum through the spouts. The shield 19′ as shown in Fig. 4, permits a determined quantity of seeds to pass through the spouts from the drum, and prevents clogging of the mouth of the spout. The disks 18 are rotated, through the medium of shaft 16 and sprocket wheel 17, by a rack bar 20, which is attached to the frame 1 and rigid and stationary therewith.

In operation, the implement is drawn along on the ground and the forward plow 5 opens a furrow. The travel of the implement turns the wheels 2 and drum 8, the latter carrying with it the spouts 10, 10 and wheels 17. The rack bar 20 is arranged in the path of rotation of the wheels 17 so that as these wheels turn under the drum they contact with the teeth of the rack bar. The toothed portion of the rack bar 20 is long enough to insure a half turn to the shaft 16, and with said shaft the disk 18 turns the same degree of rotation. In this manner a quantity of seed are turned into the spout by the cupped disk as each spout begins its travel upwardly and forwardly from the rear. The spout now carries the seed held in the outer curve of the cupped disk as it rises from the rear and after passing forwardly and downwardly, with the rotation of the drum, deposits the seed that have been turned out by the disk into the furrow. The plows 6 which follow the seed droppers turn the soil inwardly toward the furrow and cover the deposited seed as will be understood.

Having thus fully described my invention what I claim as new and desire to secure by Letters Patent is:—

1. The combination with a supporting frame, a furrow opening plow and furrow closing plows, of a pair of supporting wheels and a seed-carrying drum rotatable therewith, spouts opening from said drum, and seed dropping mechanism located in each spout with means for operating said mechanism.

2. The combination with a supporting frame, a front plow and a pair of rear plows, a pair of supporting wheels and a seed-carrying receptacle rotatable therewith, spouts opening from said receptacle, rotatable seed dropping mechanism located in each spout, and means for rotating said mechanism.

3. The combination with a frame suitably supported and a seed carrying drum rotatable therein, spouts opening from said drum, seed dropping mechanism located in said spouts, a movable member connected to said seed dropping mechanism, and means in the path of movement of said member adapted to contact therewith and actuate the seed dropping mechanism.

4. The combination with a supporting frame, a seed carrying drum, rotatable therein and spouts opening from said drum, of a cupped disk located in each spout and adapted to rotate, a shaft for said disk, a cog wheel on said shaft, and a rack bar supported on the frame in the path of movement of said cog wheel, whereby the rack bar with the cog wheel actuates the seed dropping cupped disk.

In testimony whereof I affix my signature in presence of two witnesses.

JOHN LLOYD HEAD.

Witnesses:
 Wm. R. Hill,
 E. F. Alexander.

Copies of this patent may be obtained for five cents each, by addressing the "Commissioner of Patents, Washington, D. C."